United States Patent
Owen et al.

(10) Patent No.: US 7,239,413 B2
(45) Date of Patent: Jul. 3, 2007

(54) PRINTER REPLACEABLE COMPONENT

(75) Inventors: Kevin Owen, Meridian, ID (US); Jeetendra Kumar, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 804 days.

(21) Appl. No.: 10/282,439

(22) Filed: Oct. 29, 2002

(65) Prior Publication Data

US 2004/0080775 A1    Apr. 29, 2004

(51) Int. Cl.
*G06F 15/00*    (2006.01)
*G06F 3/12*    (2006.01)
*G06F 11/30*    (2006.01)
*G03G 5/00*    (2006.01)
*G03G 7/00*    (2006.01)
*B41J 2/175*    (2006.01)
*B41J 2/235*    (2006.01)

(52) U.S. Cl. .................. 358/1.15; 399/24; 399/25; 399/26; 399/27; 347/86; 347/117; 347/50; 355/112; 355/88; 358/1.16

(58) Field of Classification Search ............... 358/1.14, 358/1.15, 1.16; 348/64; 399/27, 24, 25, 399/46; 396/429; 347/117, 86, 19–20; 400/208; 355/112, 88

See application file for complete search history.

(56) References Cited

U.S. PATENT DOCUMENTS

| | | | |
|---|---|---|---|
| 4,961,088 A * | 10/1990 | Gilliland et al. | 399/25 |
| 6,312,083 B1 * | 11/2001 | Moore | 347/19 |
| 6,386,772 B1 * | 5/2002 | Klinefelter et al. | 400/208 |
| 6,431,669 B1 * | 8/2002 | Silverbrook | 347/2 |
| 6,894,792 B1 * | 5/2005 | Abe | 358/1.15 |
| 2003/0184624 A1 * | 10/2003 | Kinalski | 347/86 |
| 2003/0215246 A1 * | 11/2003 | Tabb et al. | 399/27 |
| 2006/0024048 A1 * | 2/2006 | Schmidt | 396/429 |

OTHER PUBLICATIONS

Romano, Frank J., Delmar's Dictionary of Digital Printing & Publishing, 1997, Delmar Publishers Inc. p. 481.*

* cited by examiner

*Primary Examiner*—Aung S. Moe
*Assistant Examiner*—Scott A. Schlack

(57) ABSTRACT

A replaceable component is installable in and removable from a printing device and contains one or more supplies used in printing by the printing device. A memory and a port are in the replaceable component. Data that characterizes usage of the one or more supplies in printing by the printing device is stored in the memory. The data can be transferred through a cable from the port to a host computer using a data transfer protocol of the port.

43 Claims, 3 Drawing Sheets

PRINTER REPLACEABLE COMPONENT

FIELD OF THE INVENTION

The present invention relates to a consumable that is used in a printing operation. More particularly, the invention relates to a port for communication of data characterizing the consumption of the consumable.

BACKGROUND OF THE INVENTION

Most types of printing devices are equipped with items that are used up and/or have a life cycle during printing operations. These items can include one or more printing supplies, a printing media (e.g. paper) available to be printed on during the printing, a printing substance (e.g. ink, toner, etc.) available for application to the printing media during the printing, a laser printer drum, a laser printer developer, a laser printer fuser, a printing media transfer belt, staples for stapling the printing media during the printing process, a storage volume that is available to store paper that has been printed on by the printing device, and the like. These items are referred to herein as replaceable components. When a replaceable component is exhausted or is at the end of its life cycle, the replaceable component must be replaced for the printing device to continue to function properly. For example, a replaceable component such as a toner cartridge can be refilled when it is exhausted, or a toner cartridge that is out of toner can be removed from a printing device and a full toner cartridge can then be installed in the printing device to provide a toner for further printing operations.

Replaceable components can be manufactured with memory which can be placed on the replaceable component itself or within a label affixed to the replaceable component. This memory is typically used to store printer-related data that the printer reads to determine various printing parameters. For example, the memory may store the model number of a toner cartridge so that the printer may recognize the toner cartridge as valid or invalid for use with that printer. Other examples of memory storage include printer firmware revisions, a list of accessories installed in the printer (e.g. input trays, output bins, extra memory, network card(s) etc.), the date and place of manufacture, etc.) Printer usage data may also be stored in the memory. As documents are printed, the printer usage data is accumulated in the memory as the replaceable component is used in the printing operations of the printer. The printer can communicate with the memory in the replaceable component to determine and interpret the data in the memory. A drawback of this arrangement is that this data cannot be retrieved unless the replaceable component is installed in a printing device. Consequently, there is a need for improved methods, replaceable components, and systems that provide communication with memory in a replaceable component without requiring a printing device.

SUMMARY OF THE INVENTION

The above-stated needs and/or others are met, for example, by a replaceable component installable in and removable from a printing device and containing one or more supplies used in printing by the printing device. The replaceable component includes a memory and a port. The memory stores data characterizing usage of the one or more supplies in printing by the printing device. The port accepts a cable for communications of the data with a host computer using a data transfer protocol of the port.

DESCRIPTION OF THE DRAWINGS

Implementations are illustrated by way of example and not limitation in the figures of the accompanying drawings. The same numbers are used throughout the figures to reference like components and/or features.

DETAILED DESCRIPTION

Methods, host computers, and replaceable components, according to various implementations, relate to a host computer such as a mainframe computer, a minicomputer, a workstation, a desktop computer, a laptop computer, or a Personal Digital Assistant (PDA) that is connected by a cable to a replaceable component. The cable is operatively connected to a port on each of the host computer and the replaceable component. The data stored in memory in the replaceable component is communicated through the cable using a data transfer protocol compatible with each port.

As electronic devices or appliances, such as computers, become more powerful, a great amount of effort has been spent to allow the appliances to share data with one another. Of the available systems, the several are efficient systems each having a respective data transfer protocol. These include an IEEE 1394 system or "Firewire" that allows high-speed data transfer between various IEEE 1394 compliant appliances. The host computer and the replaceable component are connected through an IEEE 1394 compliant cable to communicate by sending data to and receiving data from one another.

Another system is a Universal Serial Bus (USB) system which is a standard peripheral interface known in the art. In one implementation the host computer includes a USB port. The USB port provides an interface between the cable and the host computer. The USB is a cable bus that supports data exchange between a host computer and the replaceable component. When attached, the replaceable component communicates in USB bandwidth through a host-scheduled, token-based protocol. The bus allows the replaceable component to be attached, configured, used, and detached while the host and other peripherals are in operation. The USB is defined by a specification that is approved by a committee of industry representatives. The specification covers all aspects of USB operation, including electrical, mechanical, and communications characteristics. To be called a USB device, a peripheral must conform to this very exacting specification.

Other implementations of systems use known data transfer protocols, including the serial data transfer protocol, the parallel data transfer protocol, the Personal Computer Memory Card Industry Association (PCMCIA) data transfer protocol, the Phillips Inter-IC or I$^2$C-bus data transfer protocol, the Small Computer System Interface (SCSI) data transfer protocol, a fiber optic data transfer protocol, a coaxial or Ethernet data transfer protocol, or other data transfer protocols for transmission of data through a plurality of electrical conductors.

Figure 1:
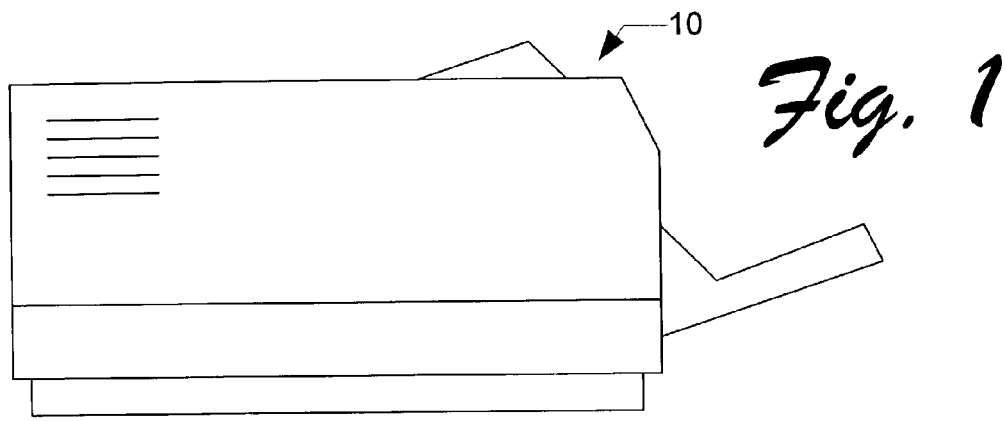
FIG. 1 is a diagrammatic illustration of a laser printer.
Figure 2:
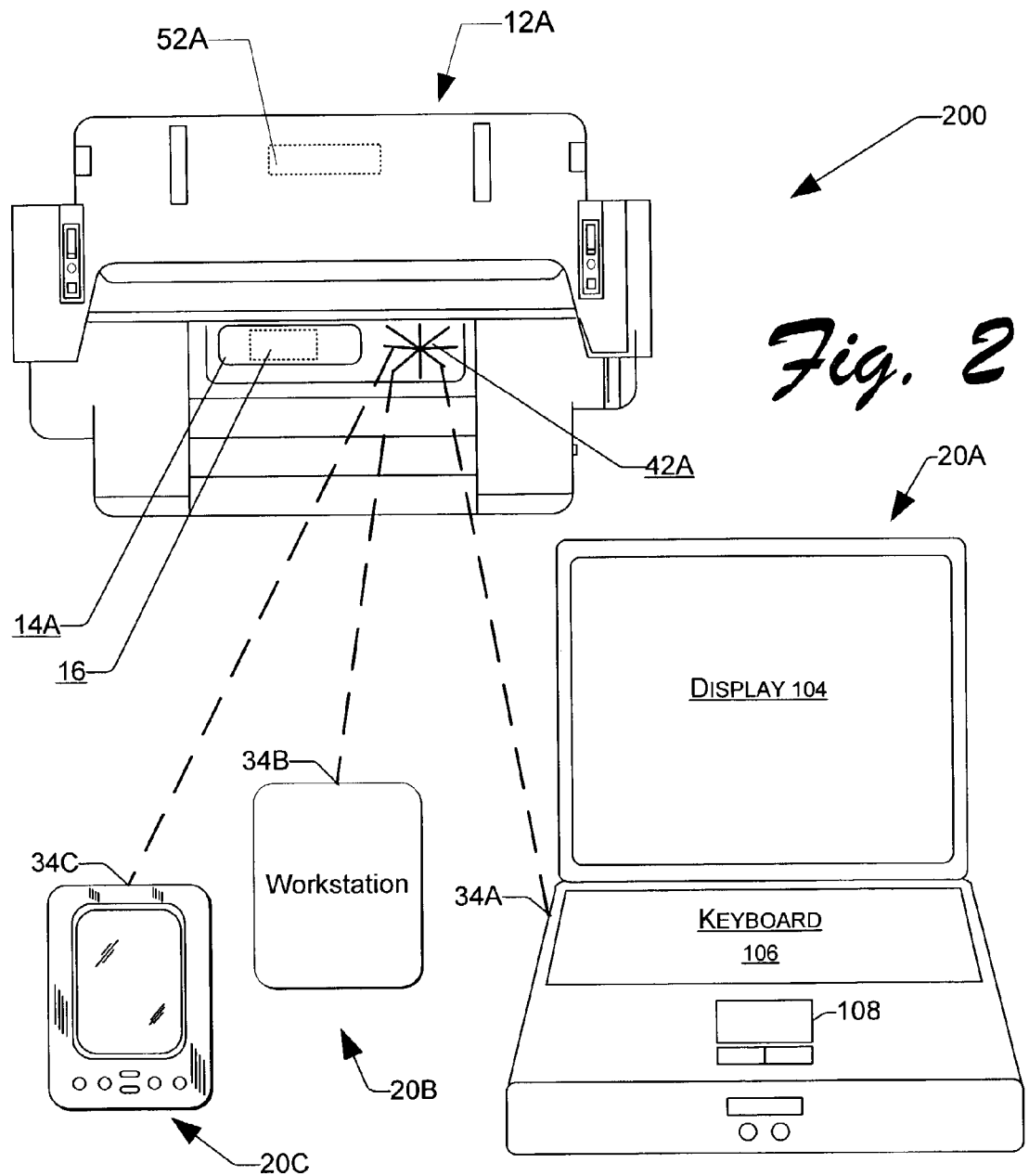
FIG. 2 is a diagrammatic illustration of a laser printer toner cartridge in communication with one or more host computers.

FIG. 1 is a diagrammatic illustration of a laser printer 10. FIG. 2 shows a toner cartridge 12A that is installable in the laser printer 10. The toner cartridge 12A has a label 16 that contains information identifying the toner cartridge 12A to a user. The label 16 typically recites the name of the manufacturer, the model number of the cartridge, etc. Although various implementations are shown and described herein with respect to a printer toner cartridge for a laser printer, it is noted that other implementations may be embodied as any replaceable component (toner cartridge, ink cartridge, fuser, drum, etc.) that is installable in and removable from a printing device (printer, copier, fax machine, etc.).

A memory tag 14A can be, but need not be, placed beneath a human-readable label. As depicted, memory tag 14A is located underneath the label 16 on the toner cartridge 12A, although the memory tag 14A may be placed on or in the toner cartridge 12A at any location which may be practical for the purposes described herein. The memory tag 14A, which can be conventional semiconductor memory, can communicate with laser printer 10 by a direct electrical connection thereto, and would be, as such, a direct connection memory tag. Alternatively, memory tag 14A can be a radio frequency identification (RFID) memory tag. RFID memory tags, sensor communications, and applications therefore are well known in the art. One or more sensors 52A can be in and/or on the toner cartridge 12A so that they can be used to sense and/or measure a quantity of toner that is available of in the toner cartridge 12A.

The memory tag 14A can also communicate with one or more host computers through a port 42A. Port 42A is operatively connected by a cable to a port on each of the one or more host computers. The data stored in memory tag 14A is communicated through the cable using a data transfer protocol compatible with each port. FIG. 2 shows examples of a host computer including a laptop computer 20A having a port 34A, a workstation 20B having a port 34B, and a PDA 20C having a port 34C. The laptop computer 20A has a display 104 and a keyboard 106. Port 34A can be a PCMCIA port. Workstation 34B can be a desktop computer. PDA 20C is a compact device that can serve various functions including a cellular phone, facsimile transmitter, personal organizer, and the like. PDAs typically include a stylus and/or a touch screen for user input, and may include a keyboard or a limited number of input keys. PDAs can be used for such things as sending and retrieving e-mail, Web browsing, and data-sharing applications over the Internet, intranet or corporate networks.

Memory tag 14A can receive power through the cable. When memory tag 14A is implemented as an RFID memory tag, an RF signal can be emitted, such as by the cable, which signal can then be received by an antennae in memory tag 14A. The receipt of the signal by the antennae generates sufficient power for the use of the memory tag 14A.

Figure 3:
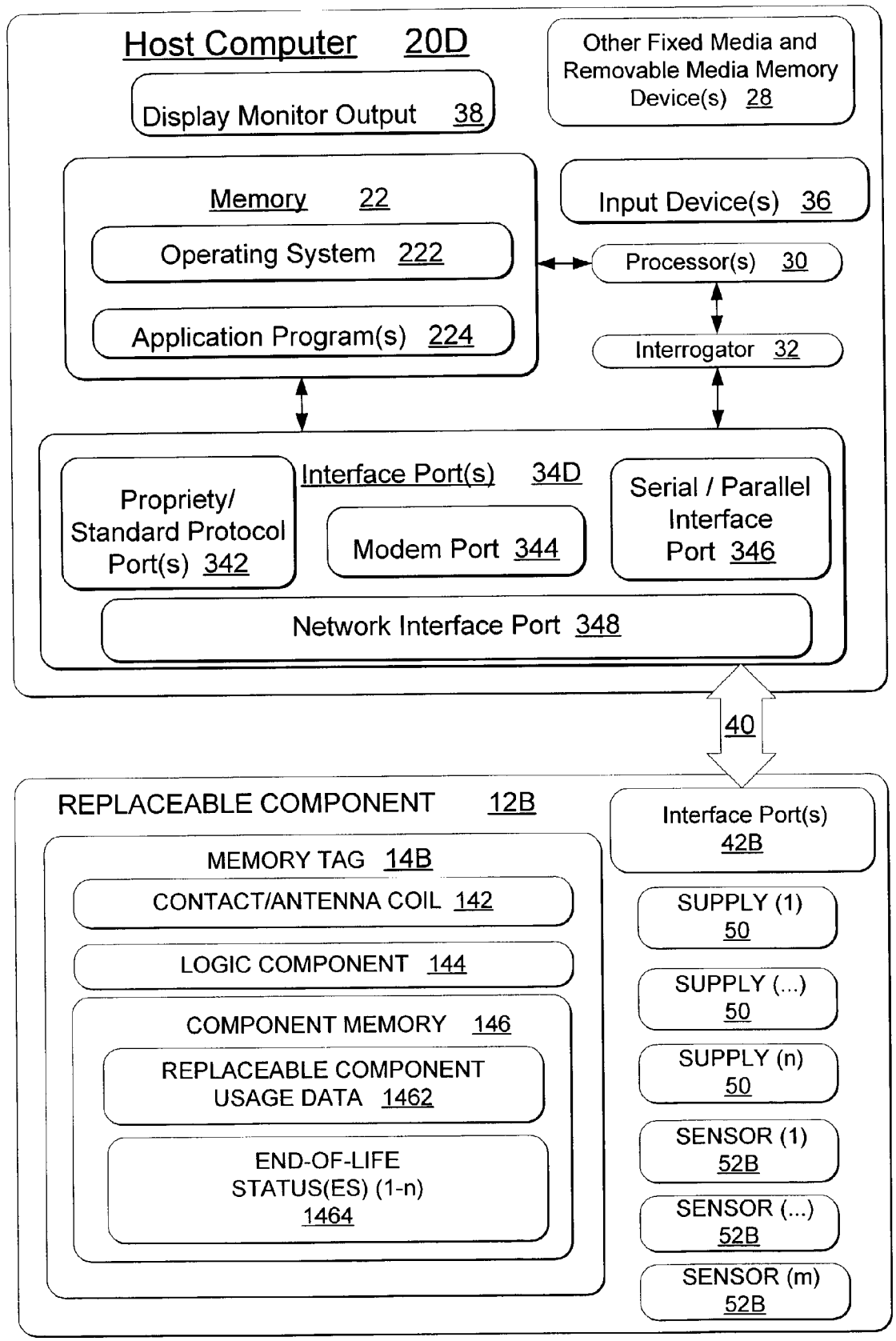
FIG. 3 is a system depicted in respective block diagrams of a host computer and a replaceable component, these being in communication via a respective port on each, where each port uses the same data transfer protocol to communicate through a cable that is attached to each port.

FIG. 3 is a block diagram of a system 300 that includes a host computer 20D in communication by a cable 40 with a replaceable component 12B in accordance with an implementation. Host computer 20D can be laptop 20, workstation 20B, PDA 20C, a general purpose computing device, or a specific purpose computing device. Host computer 20D can also be a mainframe computer, a minicomputer, or a desktop computer. One or more processors 30, memory 22, an optional interrogator 32, interface ports 34D, one or more input devices 36, and a display monitor output 38 are included in host computer 20D. Other fixed media and removable media memory devices 28 are optionally included in host computer 20D. The memories 22 and 28, which provide data storage mechanisms, can be read-only memory (ROM), random access memory (RAM), a hard drive, a floppy disk drive, a CD-ROM drive, and other conventional memory device. The one or more processors 30 perform various instructions to control the operation of host computer 20D. These instructions can be in applications stored in memories 22 and/or 28 and include an operating system 222 and one or more application programs 224.

The one or more interface ports 34D provide a mechanism for host computer 20D to communicate with replaceable component 12B. When an application is executed by the one or more processors 30, data can be communicated via the one or more interface ports 34D, which can be one or more proprietary or standard protocol ports 342, a modem port 344, a serial or a parallel port 346, and/or a network interface port 348. One or more input device(s) 36 can be used for inputting data to host computer 20D, example of which include a keyboard, a computer mouse, a pointing device, or other mechanism for inputting information to host computer 20D.

Cable 40 is configured for a data communication protocol compatible with any of the one or more interface ports 34D as well as with one or more port interfaces 42B of replaceable component 12B. Replaceable component 12B is configured to be installed in a printing device and is also configured to be removed and replaced by a like replaceable component (not shown). A memory tag 14B and at least one supply 50 are included in replaceable component 12B. As such, supply (1) 50 through supply (n) 50 can be included in replaceable component 12B, as indicated in FIG. 3.

When the printing device engages in a printing operation, the at least one supply 50 is used in order to accomplish the printing operation. Use of at least one supply 50 by the printing device in printing a print job can result in the exhaustion of the one or more of supplies 50. At least one sensor 52B can be used to respectively measure and/or sense the quality and/or quantity of the at least one supply 50 of replaceable component 12B. As such, sensor (1) 52B through sensor (m) 52B can be used to respectively measure and/or sense the quality and/or quantity of supply (1) 50 through supply (n) 50 of replaceable component 12B. The number of supplies 50 may differ from the number of sensors 52B. By way of example, and not by way of limitation, each supply 50 can be a printing supply, a printing media available to be printed on during the printing, a printing substance available for application to the printing media during the printing, toner or ink available for application to the printing media during the printing, a laser printer drum, a laser printer developer, a laser printer fuser, a printing media transfer belt, staples for stapling the printing media during the printing, a storage volume that is available to store paper that has been printed on by the printing device, etc.

Each sensor 52B can be configured to measure and/or sense the occurrence of an end-of-life condition of at least one 50 of replaceable component 12B. By way of example of an end-of-life condition for a replaceable component 12B, the toner in a toner cartridge 12A can be measured, the measurement of which indicates an end-of-life condition for the toner in the toner cartridge 12A, a sensed and/or measured lack of a predetermined quality of a particular replaceable component 12B such that an end-of-life condition exists for the particular replaceable component 12B, a predetermined passage of time that a particular replaceable component 12B has been installed in the printing device that equates to a corresponding end-of-life condition, a measured and/or counted usage of a particular replaceable component 12B that exceeds a predetermined quantity that signifies a corresponding end-of-life condition for the particular replaceable component 12B, etc.

Memory tag 14B has a component memory 146, a logic component 144, and an electrical contact or antenna coil 142. The component memory 146 has at least one storage area that can include a replaceable component usage data 1462 and an end-of-life status (i) 1464. End-of-life status (i) 1464 can be used to respectively store an acknowledgement of the end of a serviceable life for the at least one supply 50.

Memory tag 14B, sensor(s) 52B, and end-of-life status (i) 1464 can individually or collectively operate in conjunction with the optional interrogator 32 of host computer 20D. Interrogator 32 is a device that provides power to, reads from and/or writes to, the memory tag 14B and/or other aspects of replaceable component 12B. Examples of interrogators include a memory tag reader or scanner, a memory tag writing device which stores data on the memory tag 14B, and the like. In the present example, host computer 20D can optionally include the interrogator 32 to perform functions of a reader/writer, such as monitoring the contents of component memory 146, readings from one or more sensors 52B, and replaceable component usage data 1462. The interrogator 32, when included in host computer 20D, can be electrically connected by cable 40 or the interrogator 32 can emits a radio frequency field that provides power to the memory tag 14B and/or other aspects of replaceable component 12B via the antenna coil 142. The memory tag 14B and/or other aspects of replaceable component 12B, therefore, do not require their own power supply when interrogator 32 is included in host computer 20D. Communications between the interrogator 32 via antenna coil 142 and replaceable component 12B are transmitted and received via the radio frequency field and the antenna coil 142 utilizing standard RFID method and protocol, such as promulgated in ISO 14443 and ISO 15693.

When interrogator 32 is not included in host computer 20D, execution of one or more application programs 224 by the one or more processors 30 can control communications between host computer 20D and memory tag 14B through cable 40 via the one or more interface ports 34D and 42B.

The host computer 20D and the replaceable component 12B can communicate through a network to which cable 40 is connected. In such an implementation, reference numeral 40 in FIG. 3 is intended to represent a network to which dual cables are connected that also respectively connect host computer 20D and the replaceable component 12B to the network. The network can be the Internet, a local area network (LAN), a wide area network (WAN), or the like. Alternatively, interface ports 34D and 42B communicate via cable 40 by a configuration that represents any known connection protocol or conventional connection scheme. By way of example, such schemes include USB ports and the USB data transfer protocol, IEEE 1384 ports and the IEEE 1384 data transfer protocol, serial ports and the serial data transfer protocol, parallel ports and the parallel data transfer protocol, PCMCIA ports and the PCMCIA data transfer protocol, $I^2C$ ports and the $I^2C$ data transfer protocol, SCSI ports and the SCSI data transfer protocol, optical ports and a fiber optic data transfer protocol, coaxial ports and a coaxial or Ethernet data transfer protocol, and data communication ports and a corresponding data transfer protocol for transmission of data in the memory tag of the replaceable component through a plurality of electrical conductors.

Figure 4:
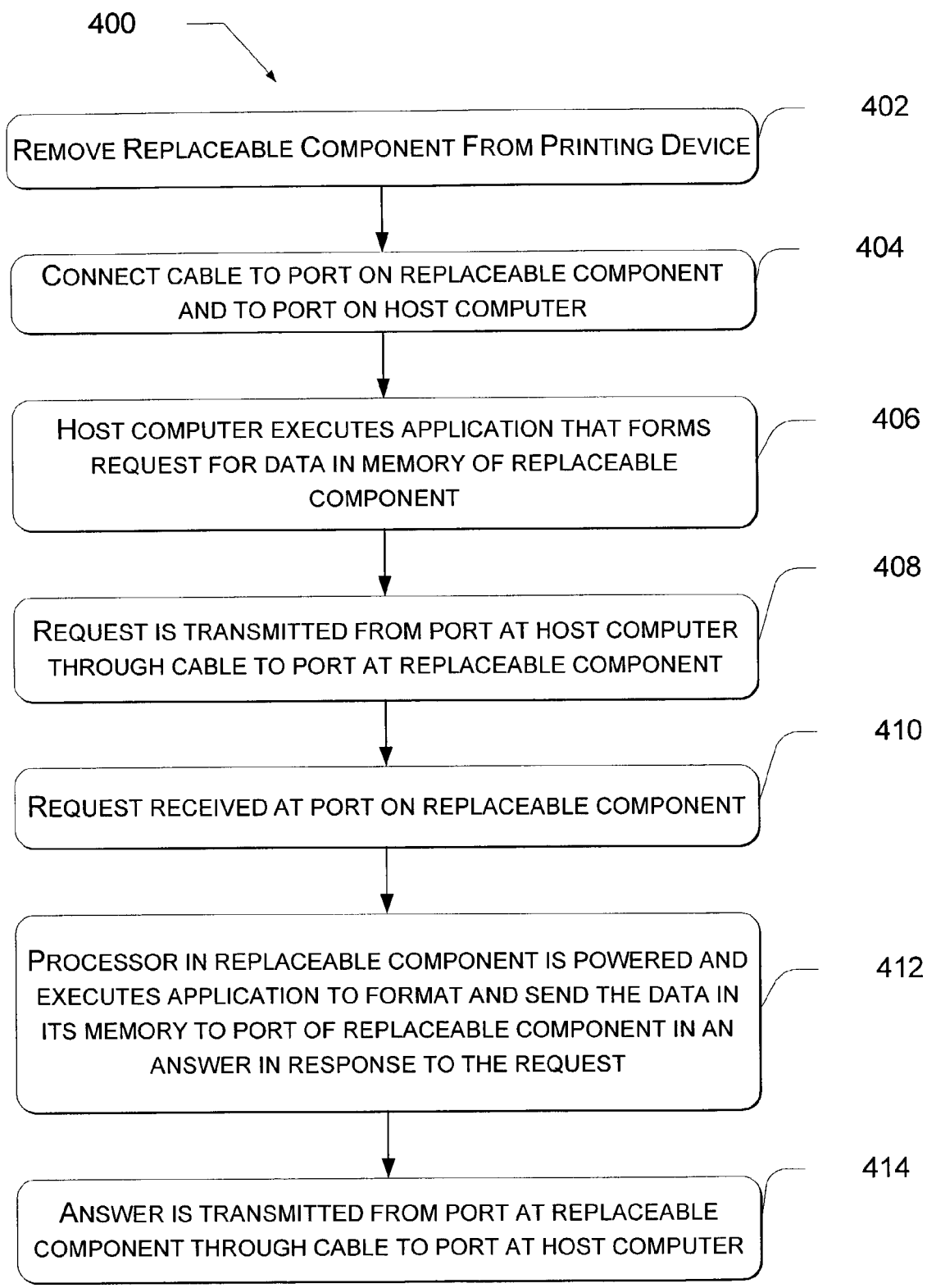
FIG. 4 is a flow diagram of a communication process utilizing a host computer and a replaceable component.

FIG. 4 depicts a process 400 in a flow diagram for communication between a host computer and a replaceable component. At block 402, a replaceable component is removed from an operatively installed position thereof in a printing device after the printing device has used one or more supplies in the replaceable component for a printing operation. During the printing operation, the printing device assisted in the storage of printer usage data in a memory of the replaceable component with respect to use of the one or more supplies in the printing operation. At block 404, a user connects one end of a cable to a port on the replaceable component and also connects the opposite end of the cable to a port on a host computer. At block 406, the host computer executes an application that forms a request for data in the memory of the replaceable component. At block 408, the request is transmitted from the port at the host computer through the cable to the port at the replaceable component. The request is formatted in a protocol that is compatible with each port and with the cable. At block 410, the request is received at the port on the replaceable component. At block 412, a processor in the replaceable component receives power to execute an application that is stored in the memory of the replaceable component. The power can be received directly from the cable. When the replaceable component includes an RFID memory tag, the power for the processor can be received by an antennae thereof that receives an RF signal. Alternatively, the replaceable component can have its own power supply. The execution of the application by the processor in the replaceable component forms an answer to the response that includes the data in the memory of replaceable component. The execution sends the answer to the port of the replaceable component. As such the data is sent in the answer in response to the request. At block 414, the answer is transmitted from the port at the replaceable component through the cable to the port at the host computer. The data in the answer can then be processed by the host computer in any of a variety of ways, including outputting all or a portion thereof for review by a user that initiated the request.

The order in which a method is described with respect to process 400 is not intended to be construed as a limitation, and any number of the described method blocks can be combined in any order to implement the method. Furthermore, the method can be implemented in any suitable hardware, software, firmware, or combination thereof.

Various printed documents can be printed by a printing device using various implementations of the replaceable component. For instance, the document can be a letter containing text that is being edited by a word processing program, an electronic mail (e-mail) message that is being created by an e-mail program, a drawing that is created by the user by operating a drawing program, a spreadsheet that the user is constructing by operating a spreadsheet program, or a poster that is being designed by a user by operating a desktop publishing program. Other types of documents are also contemplated for use in the implementations.

In various implementations, the printing device in which the replaceable component can be installed and from which the replaceable component can be removed, can be a simple dot matrix printer or a complex printer such as a digital press or a network printer. Complex printers can have capabilities that include high quality photo reproduction, multi-section reports with tabs, in-line mixed material insertion such as insertion of full-color preprinted copies and digital color-page insertion. Other complex printer capabilities include printing on substrates of varied composition, such as embossed, heavy-weight, multi-weight, and cover paper stock, as well as carbonless paper, blue prints, clear or colored transparency printing, and other specialty stock including preprinted offset color covers. Still other complex printer capabilities includes binding, collating, folding, stacking, stapling, stitching such as saddle stitching, edge-trimming, paginating for multi-language, and inline pagination and annotation. Still another printing device is a multifunction peripheral (MFP), sometimes referred to as an "All-In-One", which combines two or more peripheral devices into a single device, such as printing, scanning, copying, and facsimile transmission. The printing device can be a Graphical Display Interface (GDI) printer or a printer interpreting a page description language.

Thus, although some implementations of the various methods, replaceable components, systems, and toner cartridges have been illustrated in the accompanying Drawings and described in the foregoing Detailed Description, it will be understood that the invention is not limited to the exemplary implementations disclosed, but is capable of numerous rearrangements, modifications and substitutions without departing from the scope of the invention as set forth and defined by the following claims.

What is claimed is:

1. A replaceable component installable in and removable from a printing device and containing one or more supplies used in printing by the printing device, the replaceable component comprising:
   a memory for storing data characterizing usage of the one or more supplies in printing by the printing device;
   a first port configured to enable communication between the printing device and the memory; and
   a second port that accepts a cable for communications of the data with a host computer using a data transfer protocol of the second port of the replaceable component.

2. The replaceable component as defined in claim 1, wherein the host computer is selected from the group consisting of a mainframe computer, a minicomputer, a workstation, a desktop computer, a laptop computer, and a PDA.

3. The replaceable component as defined in claim 1, wherein the second port and the data transfer protocol are respectively selected from the group consisting of:
   a USB port and the USB data transfer protocol;
   an IEEE 1384 port and the IEEE 1384 data transfer protocol;
   a serial port and the serial data transfer protocol;
   a parallel port and the parallel data transfer protocol;
   a Personal Computer Memory Card Industry Association (PCMCIA) port and the PCMCIA data transfer protocol;
   an $I^2C$ port and the $I^2C$ data transfer protocol;
   a SCSI port and the SCSI data transfer protocol;
   an optical port and a fiber optic data transfer protocol;
   a coaxial port and an Ethernet data transfer protocol; and
   a data communication port and a data transfer protocol for transmission of data through a plurality of electrical conductors.

4. A replaceable component installable in and removable from a printing device and comprising:
   a container for one or more supplies that are used when the replaceable component is installed in the printing device and the printing device performs a printing operation;
   a memory for storing data regarding use of the one or more supplies in the printing operation;
   a processor for executing an application;
   a first port configured to enable communication between the printing device and the memory; and
   a second port that, when the processor executes the application, receives the data in the memory for transmission from the second port of the replaceable component.

5. The replaceable component as defined in claim 4, wherein the execution of the application by the processor:
   is initiated by an interrogating device; and
   controls access to the data in the memory.

6. The replaceable component as defined in claim 4, wherein the data in the memory is printer usage data received via the first port from a reader/writer located in the printing device.

7. The replaceable component as defined in claim 4, wherein the data in the memory is a page count received via the first port from a page counter in the printing device that maintains a page count that is the number of pages printed in a print job using the one or more supplies.

8. The replaceable component as defined in claim 4, wherein:
   the data in the memory corresponds to a sensed condition received from a sensor that measures the sensed condition; and
   the sensor is situated in a location selected from the group consisting of:
      the printing device; and
      the replaceable component.

9. The replaceable component as defined in claim 4, selected from the group consisting of:
   printing media available to be printed on during the printing operation;
   printing substance for printing on the printing media;
   a toner cartridge including toner for application to the printing media;
   a laser printer drum;
   a laser printer developer;
   a laser printer fuser;
   a printing media transfer belt;
   a printing media roller; and
   staples for stapling the printing media; and
   an output volume available for storage of the printing media that is to be printed on.

10. The replaceable component as defined in claim 4, wherein the memory comprises radio frequency identification (RFID) memory.

11. The replaceable component as defined in claim 4, wherein the processor, when executing the application, controls access to the data in the memory by an interrogating device located in the printing device.

12. The replaceable component as defined in claim 4, wherein the second port is selected from the group consisting of:
   a USB port configured to receive a USB cable;
   an IEEE 1384 port configured to receive an IEEE 1384 cable;
   a serial port configured to receive a serial cable;
   a parallel port configured to receive a parallel cable;
   a PCMCIA port configured to receive a PCMCIA cable;
   an $I^2C$ port configured to receive an $I^2C$ cable;
   a SCSI port configured to receive an SCSI cable;
   an optical port configured to receive a fiber optic cable;
   a coaxial port configured to receive a coaxial cable; and
   a data communication port configured to receive a cable including a plurality of electrical conductors.

13. A toner cartridge installable in and removable from a printing device and comprising:

a memory;
a processor;
a container for toner;
a first port configured to enable communication between the printing device and the memory; and
a USB port for receiving power for the processor to execute an application to transmit data in the memory to the USB port of the replaceable component.

14. The toner cartridge as defined in claim 13, further comprising a housing that is installable in and removable from a printing device; and
wherein:
the memory is configured to store the data; and
the data is printer usage data received via the first port from a reader/writer located in the printing device.

15. The toner cartridge as defined in claim 14, wherein the printer usage data is a page count received from a page counter in the printing device that maintains a page count that is the number of pages printed in a print job using the toner cartridge.

16. The toner cartridge as defined in claim 14, wherein the printer usage data is the name brand of a replaceable component received from a name brand identifier in the printing device configured to identify a name brand of a replaceable component present in the printing device.

17. The toner cartridge as defined in claim 14, wherein the printer usage data is a sensed condition received from a sensor in the printing device or in the toner cartridge that measures the sensed condition.

18. The toner cartridge as defined in claim 14, wherein:
the toner cartridge is a laser printer toner cartridge; and
the printing device is a laser printer.

19. The toner cartridge as defined in claim 13, wherein:
the memory comprises RFID memory.

20. A system comprising:
a replaceable component installable in and removable from a printing device and including:
a container for one or more supplies that are used when the replaceable component is installed in the printing device and the printing device performs a printing operation;
a memory for storing data regarding use of the one or more supplies in the printing operation;
a processor for executing an application;
a first port configured to enable communication between the printing device and the memory; and
a second port that, when the processor executes the application, receives the data in the memory for transmission from the second port of the replaceable component;
a host computer, not performing the printing operation, having a host port and executing an application to transmit a request for the data in the memory of the replaceable component to the host port; and
a cable, operatively engaged with the host port of the host computer and the second port of the replaceable component, for communicating the data in the memory of the replaceable component to the host computer.

21. The system as defined in claim 20, wherein the replaceable component is selected from the group consisting of:
printing media available to be printed on during the printing operation;
printing substance for printing on the printing media;
a toner cartridge including toner for application to the printing media;
a laser printer drum;
a laser printer developer;
a laser printer fuser;
a printing media transfer belt;
a printing media roller; and
staples for stapling the printing media; and
an output volume available for storage of the printing media that is to be printed on.

22. The system as defined in claim 20, wherein the host port and the second port of the replaceable component are each selected from the group consisting of:
a USB port configured to receive a USB cable;
an IEEE 1384 port configured to receive an IEEE 1384 cable;
a serial port configured to receive a serial cable;
a parallel port configured to receive a parallel cable;
a PCMCIA port configured to receive a PCMCIA cable;
an $I^2C$ port configured to receive an $I^2C$ cable;
a SCSI port configured to receive an SCSI cable;
an optical port configured to receive a fiber optic cable;
a coaxial port configured to receive a coaxial cable; and
a data communication port configured to receive a cable including a plurality of electrical conductors.

23. The system as defined in claim 20, wherein the memory comprises RFID memory.

24. The system as defined in claim 20, wherein the data in the memory of the replaceable component is printer usage data received via the first port from a reader/writer located in the printing device.

25. The system as defined in claim 24, wherein the printer usage data is a page count received via the first port from a page counter in the printing device that maintains a page count that is the number of pages printed in a print job using the toner cartridge.

26. The system as defined in claim 24, wherein the printer usage data is the name brand of a replaceable component received from a name brand identifier in the printing device configured to identify a name brand of a replaceable component present in the printing device.

27. The system as defined in claim 24, wherein the printer usage data is a sensed condition received from a sensor in the printing device or in the toner cartridge that measures the sensed condition.

28. The system as defined in claim 24, wherein:
the replaceable component is a laser printer toner cartridge; and
the printing device is a laser printer.

29. A method comprising:
at a first port of a replaceable component, receiving, from a printing device, data regarding the use of one or more supplies in the replaceable component;
saving the data in a memory of the replaceable component;
following an establishment of a connection between a second port of the replaceable component and a host computer, communicating the data in the memory of the replaceable component via the connection to the host computer.

30. The method as defined in claim 29, wherein:
the replaceable component includes a processor for executing an application; and
wherein communicating comprises receiving power to the processor via the connection enabling the processor to execute the application to communicate the data in the memory to the host computer via the connection.

31. The method as defined in claim 30, wherein the processor, when executing the application, controls access to the data in the memory by an interrogating device located in the printing device.

32. The method as defined in claim 29, wherein the replaceable component is selected from the group consisting of:
   printing media available to be printed on during the printing operation;
   printing substance for printing on the printing media;
   a toner cartridge including toner for application to the printing media;
   a laser printer drum;
   a laser printer developer;
   a laser printer fuser;
   a printing media transfer belt;
   a printing media roller; and
   staples for stapling the printing media; and
   an output volume available for storage of the printing media that is to be printed on.

33. The method as defined in claim 29, wherein the data in the memory is printer usage data received at the first port from a reader/writer located in the printing device.

34. The method as defined in claim 29, wherein the data in the memory is a page count received from a page counter in the printing device that maintains a page count that is the number of pages printed in a print job using the one or more supplies.

35. The method as defined in claim 29, wherein:
   the data in the memory is an sensed condition received from a sensor that measures the sensed condition; and
   the sensor is situated in a location selected from the group consisting of:
      the printing device; and
      the replaceable component.

36. The method as defined in claim 29, wherein the second port is selected from the group consisting of:
   a USB port configured to receive a USB cable;
   an IEEE 1384 port configured to receive an IEEE 1384 cable;
   a serial port configured to receive a serial cable;
   a parallel port configured to receive a parallel cable;
   an I$^2$C port configured to receive an I$^2$C cable;
   a PCMCIA port configured to receive a PCMCIA cable;
   a SCSI port configured to receive an SCSI cable;
   an optical port configured to receive a fiber optic cable;
   a coaxial port configured to receive a coaxial cable; and
   a data communication port configured to receive a cable including a plurality of electrical conductors.

37. A replaceable component for a printing device comprising:
   a first port and a second port;
   means for storing one or more supplies used in a printing operation by the printing device;
   means for dispensing the one or more supplies when the replaceable component is installed in the printing device performing the printing operation;
   means for receiving, from the printing device at the first port, printer usage data characterizing usage of the one or more supplies in printing operation by the printing device;
   means for storing the printer usage data received at the first port
   means for communicating, via the second port of the replaceable component, the printer usage data to a host computer using a data transfer protocol, wherein the host computer does not perform a printing operation.

38. The replaceable component of claim 1, wherein the first port is a port selected from the group consisting of a port configured for direct electrical communication between the replaceable component and the printing device and a port capable of enabling radio frequency communication.

39. The replaceable component of claim 4, wherein the first port is a port selected from the group consisting of a port configured for direct electrical communication between the replaceable component and the printing device and a port capable of enabling radio frequency communication.

40. The toner cartridge of claim 13, wherein the first port is a port selected from the group consisting of a port configured for direct electrical communication between the replaceable component and the printing device and a port capable of enabling radio frequency communication.

41. The system of claim 20, wherein the first port is a port selected from the group consisting of a port configured for direct electrical communication between the replaceable component and the printing device and a port capable of enabling radio frequency communication.

42. The method of claim 29, wherein the establishment of the connection is accomplished through the connection of a cable to the second port of the replaceable component and to a port of the host computer.

43. The method of claim 29, wherein the first port is a port selected from the group consisting of a port configured for direct electrical communication between the replaceable component and the printing device and a port capable of enabling radio frequency communication.

* * * * *

UNITED STATES PATENT AND TRADEMARK OFFICE
CERTIFICATE OF CORRECTION

| | | |
|---|---|---|
| PATENT NO. | : 7,239,413 B2 | Page 1 of 1 |
| APPLICATION NO. | : 10/282439 | |
| DATED | : July 3, 2007 | |
| INVENTOR(S) | : Kevin Owen et al. | |

It is certified that error appears in the above-identified patent and that said Letters Patent is hereby corrected as shown below:

In column 12, line 14, in Claim 37, after "port" insert -- ; --.

Signed and Sealed this

Sixteenth Day of September, 2008

JON W. DUDAS
*Director of the United States Patent and Trademark Office*